United States Patent
Vetter et al.

(10) Patent No.: US 7,322,455 B2
(45) Date of Patent: Jan. 29, 2008

(54) TORQUE TRANSMITTING UNIT

(75) Inventors: Christoph Vetter, Karlsruhe (DE); Norbert Indlekofer, Bühl (DE); Bernhard Walter, Oberkirch (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 146 days.

(21) Appl. No.: 11/156,720

(22) Filed: Jun. 20, 2005

(65) Prior Publication Data
US 2005/0279604 A1    Dec. 22, 2005

(30) Foreign Application Priority Data
Jun. 21, 2004 (DE) .................. 10 2004 029 776

(51) Int. Cl.
B60K 17/02 (2006.01)
F16D 25/10 (2006.01)
F16D 25/12 (2006.01)

(52) U.S. Cl. ............... 192/48.9; 192/55.61; 192/87.15; 192/212

(58) Field of Classification Search ............. 192/55.61, 192/87.11, 87.15, 212
See application file for complete search history.

(56) References Cited

U.S. PATENT DOCUMENTS

| | | | |
|---|---|---|---|
| 3,105,581 A * | 10/1963 | Schick .................. | 192/98 |
| 4,411,549 A * | 10/1983 | Sheppard .................. | 403/258 |
| 5,524,739 A * | 6/1996 | Baier et al. .............. | 192/70.16 |
| 6,397,996 B1 | 6/2002 | Yabe ...................... | 192/55.61 |
| 6,401,894 B1* | 6/2002 | Merkel et al. ............. | 192/48.9 |
| 2003/0079953 A1 | 5/2003 | Carlson et al. ........... | 192/48.8 |
| 2003/0150684 A1* | 8/2003 | Kundermann et al. ... | 192/70.16 |
| 2004/0154893 A1* | 8/2004 | Braford, Jr. ............. | 192/55.61 |
| 2004/0206599 A1* | 10/2004 | Hegerath ................. | 192/87.11 |

FOREIGN PATENT DOCUMENTS

| | | |
|---|---|---|
| DE | 41 17 582 A1 | 12/1991 |
| DE | 101 46 837 A1 | 5/2002 |
| EP | 1 174 631 A2 | 1/2002 |
| GB | 2 244 543 A | 12/1991 |

* cited by examiner

*Primary Examiner*—Rodney H. Bonck
(74) *Attorney, Agent, or Firm*—Alfred J. Mangels

(57) ABSTRACT

A torque transmitting unit in the power train of a motor vehicle for transmitting torque between a drive unit having an output shaft and a transmission having at least one input shaft. At least one clutch unit is positioned between the drive unit and the transmission, and at least one vibration damping unit having an input part and an output part is provided and is connected between the drive unit output shaft and the clutch unit. The clutch unit includes a clutch cover that defines a clutch-containing volume and that is supported by a transmission housing section. The vibration damping unit is positioned with in the clutch-containing volume defined by the clutch cover. For optimization of structural space, both the input part and the output part of the vibration damping unit are supported in the radial direction by the clutch cover.

11 Claims, 3 Drawing Sheets

TORQUE TRANSMITTING UNIT

BACKGROUND OF THE INVENTION

The present invention relates to a torque transmitting unit in the power train of a motor vehicle for transferring torque between a drive unit, in particular a combustion engine, having an output shaft, in particular a crankshaft, and a transmission having at least one input shaft, in particular two input shafts, with at least one clutch device and at least one vibration damping unit having an input part and an output part, which is connected between the output shaft of the drive unit and the clutch device, the clutch unit having a clutch housing section, in particular a clutch cover, which limits the volume accommodating the clutch device and is supported by a transmission housing section, the vibration damping unit being positioned in the volume limited by the clutch housing section, which accommodates the clutch device.

The object of the invention is to create a torque transmission device described above, optimized with regard to the construction space, which is simply constructed and is capable of being manufactured economically.

SUMMARY OF THE INVENTION

The problem is solved in a torque transmitting unit in the power train of a motor vehicle for transferring torque between a drive unit, in particular a combustion engine, having an output shaft, in particular a crankshaft, and a transmission having at least one input shaft, in particular two input shafts, with at least one clutch device and at least one vibration damping unit having an input part and an output part, which is connected between the output shaft of the drive unit and the clutch device, the clutch unit having a clutch housing section, in particular a clutch cover, which limits the volume accommodating the clutch device and is supported by a transmission housing section, the vibration damping unit being positioned in the volume limited by the clutch housing section, which accommodates the clutch device, in that both the input part and the output part of the vibration damping unit or the input part of the clutch device are borne or supported in the radial direction directly or indirectly on the clutch housing section. The vibration damping unit is preferably a damped flywheel. Due to the support of the device according to the invention, bearing devices between the input part and/or the output part of the vibration damping unit and the transmission input shaft or the output shaft of the combustion engine may be dispensed with. In addition, the tolerance chain from the output shaft of the combustion engine to the transmission input shaft is reduced.

The problem stated above is also solved in a torque transmitting unit described above by having the vibration damping unit positioned radially outside of the clutch device and overlapping it in the axial direction. That makes it possible to save construction space in the axial direction.

The problem stated above is also solved in a torque transmitting unit described above by having the input part of the vibration damping unit comprise a vibration damping unit cage in which spring devices are at least partially contained, which are engaged by the output part of the vibration damping unit. An essentially circular-ring-shaped connecting piece, which extends out of the vibration damping unit cage, is preferably positioned between the clutch housing section and the clutch device, viewed in the axial direction.

A preferred exemplary embodiment of the torque transmitting unit is characterized in that the input part of the vibration damping unit is welded to a hub part which is supported in the radial direction on the clutch housing section. The hub part can also be formed in a single piece with the input part of the vibration damping unit.

Another preferred exemplary embodiment of the torque transmitting unit is characterized in that the hub part includes a hub bearing part which is of conical design on the inside and is provided with internal toothing that engages the external toothing which is formed on a coupling part that has a section which is formed complementarily to the cone of the hub bearing part. A separable attachment of the coupling part to the hub part is made possible through the conical, toothed sections which are engaged with each other.

Another preferred exemplary embodiment of the torque transmitting unit is characterized in that the coupling part is attached to the hub bearing part so that it can repeatedly be separated non-destructively, in particular with the help of a screw connection. However, the coupling part can also be formed in a single piece with the hub part or welded to it.

Another preferred exemplary embodiment of the torque transmitting unit is characterized in that the output part of the vibration damping unit is supported on the hub part, in particular in both the axial and the radial directions. For this purpose an essentially circular-ring-shaped indentation may be provided on the hub part, having a rectangular cross section which engages an essentially complementarily shaped elevation which is formed on the output part.

Another preferred exemplary embodiment of the torque transmitting unit is characterized in that the clutch device includes a wet-operating clutch arrangement, in particular a multiple-disk clutch arrangement. Preferably, the clutch device includes two wet-operating multiple-disk clutch arrangements.

Another preferred exemplary embodiment of the torque transmitting unit is characterized in that two wet-operating clutch arrangements are positioned coaxially and overlapping each other in the axial direction. That makes it possible to save construction space in the axial direction.

In a power train of a motor vehicle, the problem indicated above is solved by installing a torque transmitting unit described above.

BRIEF DESCRIPTION OF THE DRAWINGS

Additional advantages, characteristics, and details of the present invention are evident from the following description, in which various embodiments are described in detail with reference to the drawing. The characteristics mentioned in the claims and in the description may be essential to the invention individually by themselves or in any combination. The figures show the following:

DESCRIPTION OF THE PREFERRED EMBODIMENTS

Figure 1:
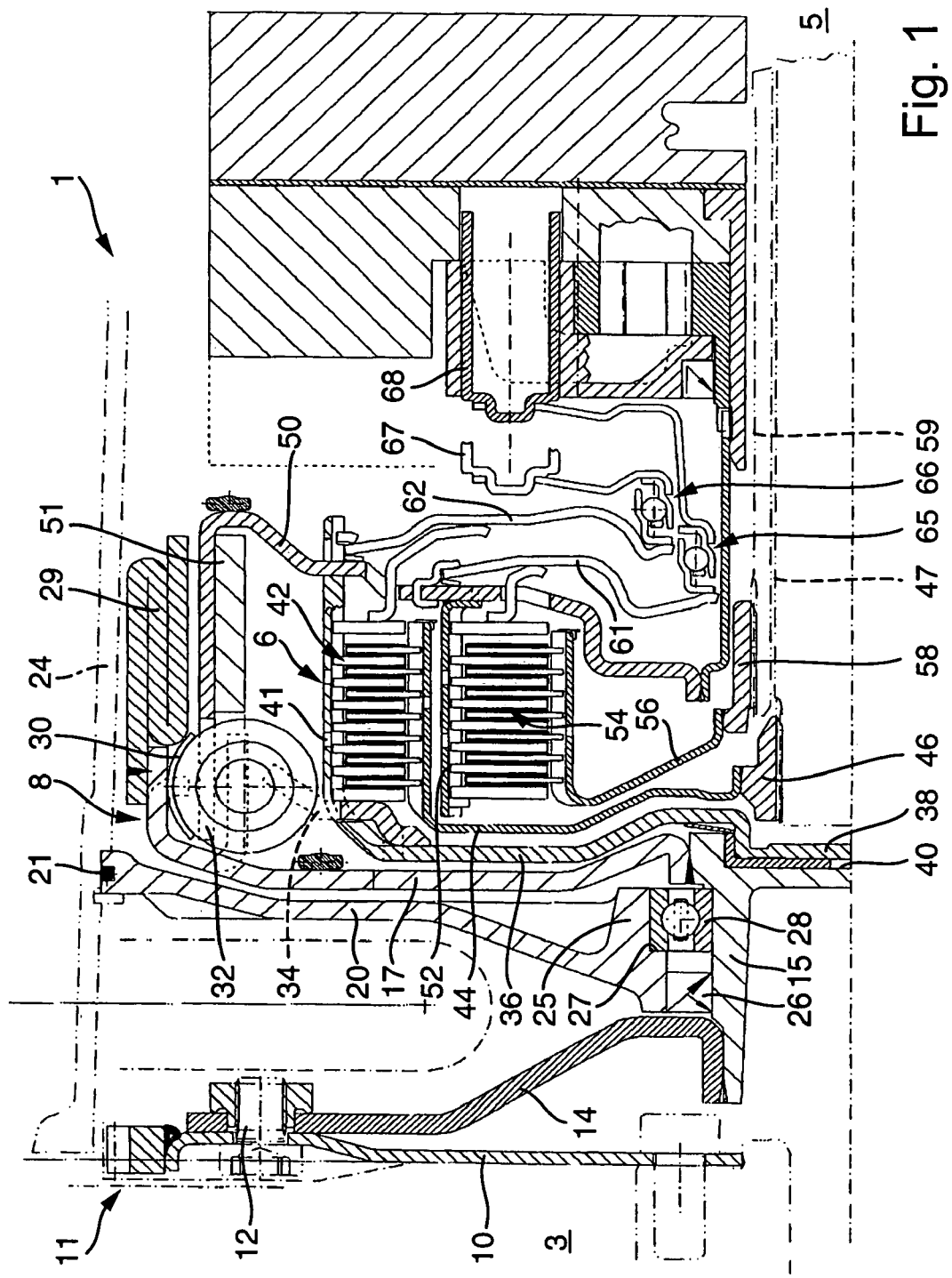
FIG. 1 shows a half-sectional view of a torque transmitting unit according to the present invention, in accordance with a first exemplary embodiment.

Part of a power train 1 of a motor vehicle is illustrated in FIG. 1. Positioned between a drive unit 3, in particular a combustion engine, and a transmission 5, is a wet-operating double clutch 6 of multiple-disk design. Connected between drive unit 3 and double clutch 6 is a vibration damping unit 8. The vibration damping unit is preferably a two-mass flywheel.

An output shaft (not shown) of drive unit 3 is coupled with a drive output part 10. Drive output part 10 has essentially the form of a circular ring extending in the radial direction, to which a starter gear rim 11 is welded radially on the outside. Drive output part 10 is connected through a screw connection 12 (of a plurality of screw connections which are evenly distributed around the circumference of drive output part 10) in a rotationally fixed connection to a connecting piece 14. Welded radially on the inside of connecting part 14 is a hub part 15, to which in turn an input part 17 of vibration damping unit 8 is welded. Positioned radially outside of hub part 15 and in the axial direction between connecting part 14 and input part 17 of vibration damping unit 8 is a clutch cover 20, which extends essentially in the radial direction. Clutch cover 20, with a seal 21 interposed, is supported on a transmission housing section 24, which is shown with broken lines in FIG. 1. Transmission section 24 and clutch cover 20, supported on it, are rigidly attached to the support structure of a motor vehicle.

Clutch cover 20 has radially on its inside an essentially round cylindrical jacket-like bearing body 25. Positioned on the side facing drive unit 3, between bearing body 25 of clutch cover 20 and hub part 15, is a sealing device 26, in particular a radial shaft seal ring. Positioned on the side facing transmission 5, between bearing body 25 of clutch cover 20 and hub part 15, is a radial bearing device 28, in particular a deep-groove ball bearing. Radial bearing device 28 is supported in the axial direction, toward drive unit 3, on a shoulder 27, which runs radially around the inside approximately in the middle of bearing body 25 of clutch cover 20. Hub part 15 is supported on clutch cover 20 by means of radial bearing device 28. Because of the support on shoulder 27 of bearing body 25 of clutch cover 20, support in the axial direction toward drive unit 3 is also made possible.

An additional mass 29 is attached radially on the outside of input part 17 of vibration damping unit 8. The attachment of additional mass 29 to input part 17 of vibration damping unit 8 is preferably accomplished by a welded joint, as indicated in FIG. 1. In addition, attached to input part 17 of vibration damping unit 8 is a vibration damping cage 30, which incorporates a plurality of spring devices 32 which extend in the circumferential direction. An output part 34 of vibration damping unit 8, which is shown in FIG. 1 with broken lines, engages spring devices 32. Output part 34 is attached to a connecting part 36, which forms the input part of the clutch. Output part 34 of vibration damping unit 8 may also be made in a single piece with clutch input part 36. Clutch input part 36 transitions internally into a bearing cup 38, which is supported in both the radial and axial directions and toward drive unit 3 in a complementarily formed bearing recess 40, which is provided on the side of hub part 15 that faces transmission 5.

Clutch input part 36 is joined in one piece to an outer disk carrier 41 of a first multiple-disk clutch arrangement 42. Positioned radially inside outer disk carrier is an inner disk carrier 44, which is attached to a hub part 46. Hub part 46 of first multiple-disk clutch arrangement 42 is connected in a rotationally-fixed connection to a first transmission input shaft 47.

Clutch input part 36 is connected in a rotationally fixed connection through a connecting part 50, to which an additional mass 51 is attached radially on the outside, to an outer disk carrier 52 of a second multiple-disk clutch arrangement 54, which is positioned radially inside of first multiple-disk clutch arrangement 42. The two multiple-disk clutch arrangements 42 and 54 completely overlap each other in the axial direction. The second multiple-disk clutch arrangement 54 has an inner disk carrier 56 which is attached to a hub part 58. Hub part 58 is connected in a rotationally fixed connection to a second transmission input shaft 59, which is designed as a hollow shaft. The first transmission input shaft 47 is positioned in hollow shaft 59 so that it can rotate.

The two multiple-shaft clutch arrangements 54 and 42 are operated by means of operating levers 61 and 62, whose radially inner ends are supported on operating bearings 65, 66. Operating bearings 65 and 66 are operated in the axial direction with the help of operating pistons 67, 68. Operating pistons 67 and 68 are arranged in fixed positions with respect to operating levers 61 and 62, which pivot with clutch input part 36.

Figure 2:
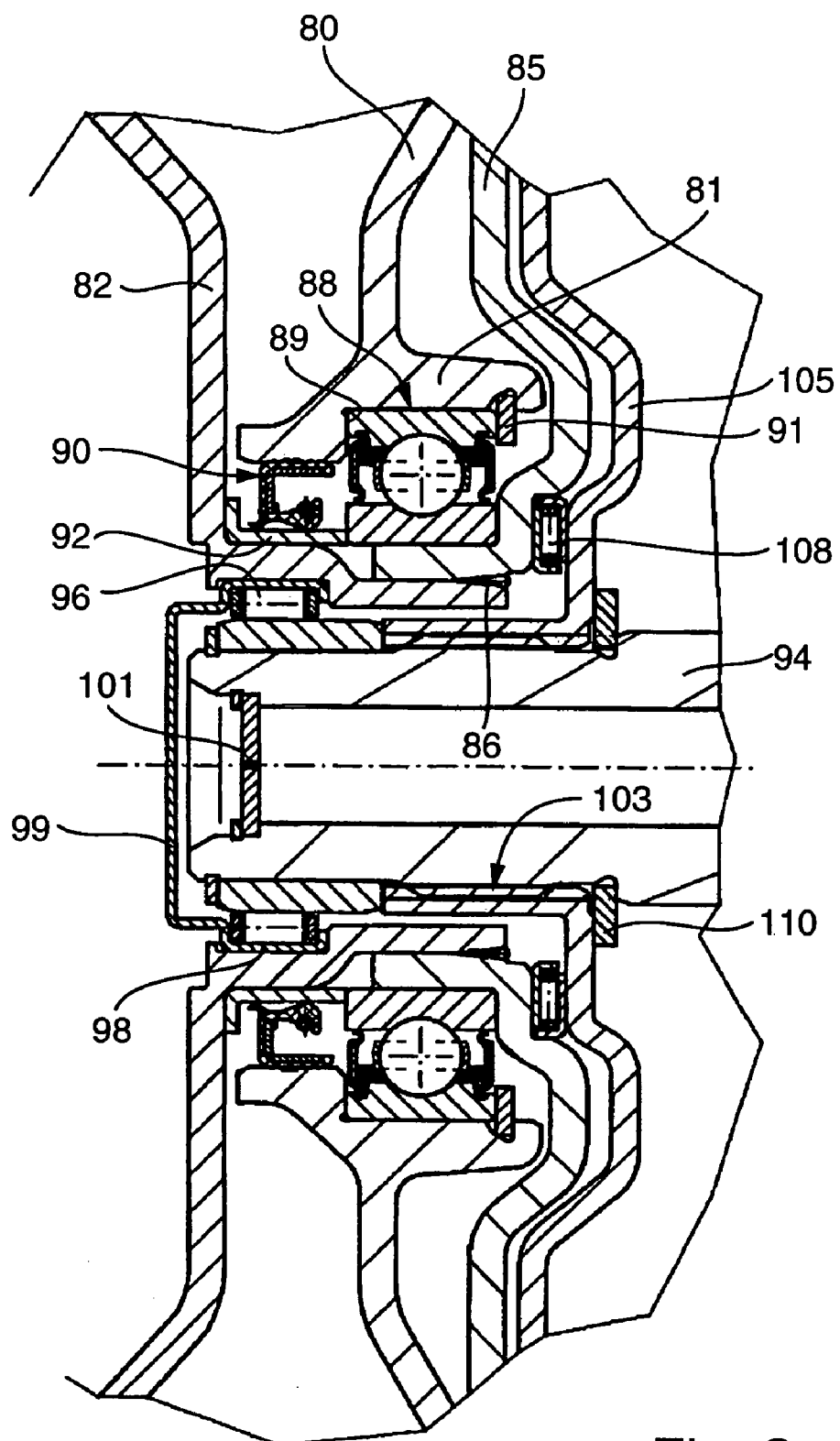
FIG. 2 shows an enlarged cutout of a longitudinal section of a torque transmitting unit according to the present invention in accordance with another exemplary embodiment.

FIG. 2 shows a longitudinal sectional view of a cutout of a clutch cover 80, which is connected radially on the inside in a single piece to a bearing body 81. Clutch cover 80 is positioned between two connecting pieces 82 and 85 which are attached to each other by a welded seam radially on the inside, in reference to clutch cover 80. Welded seam 86 is located radially on the inside, partially under a bearing device 88, which, viewed in the radial direction, is positioned between bearing body 81 of clutch cover 80 and the axially extending attaching sections of connecting parts 82 and 85. Bearing device 88 is a deep-groove ball bearing, which is supported in the axial direction both on clutch cover 80 and on connecting parts 82 and 85. Deep-groove ball bearing 88 is supported radially outwardly in the axial direction on a shoulder 89, which is provided radially inwardly on bearing body 81. On the opposite side, deep-groove ball bearing is supported radially outwardly on a supporting ring 91, which is fixed in the axial direction on bearing body 81, being partially accommodated in a groove which runs radially inside in bearing body 81. Radially inwardly, deep-groove ball bearing 88 is supported in an axial direction on a fixing element 92 of hardened material. Fixing element 92 in turn is supported in the axial direction on connecting part 82. In the opposite radial direction, deep-groove ball bearing 88 is supported radially inwardly on connecting part 85. In addition, between bearing body 81 of clutch cover 80 and the attaching section of connecting part 82, which extends in the radial direction, is a radial shaft seal ring 90.

Radially inside connecting parts 82 and 85, a transmission shaft 94 is rotatably mounted with the help of a radial bearing device 96. Between connecting part 82 and radial bearing device 96 is a sleeve 98 of hardened material. Sleeve 98 is connected in a single piece to a closing wall 99, which is positioned at the end of transmission input shaft 94, which is internally hollow, at a small distance from it. The open end of transmission input shaft 94 is closed by a cover 101, through which the lubricants can pass from the interior of transmission input shaft 94 to reach bearing device 96.

Transmission input shaft 94 is connected through toothing 103 in a rotationally fixed connection to an output part 105 of a clutch device or vibration damping unit. An axial bearing device 108 is positioned in the axial direction between output part 105 and connecting part 85. A retaining ring 110, which is positioned partially in a groove in transmission input shaft 94, fixes transmission input shaft 94 in an axial position relative to output part 105. Connecting part 82 is connected in a rotationally fixed connection to an output shaft (not shown) of a drive unit, in particular a combustion engine. Connecting part 85 is the input part of a vibration damping unit.

Figure 3:
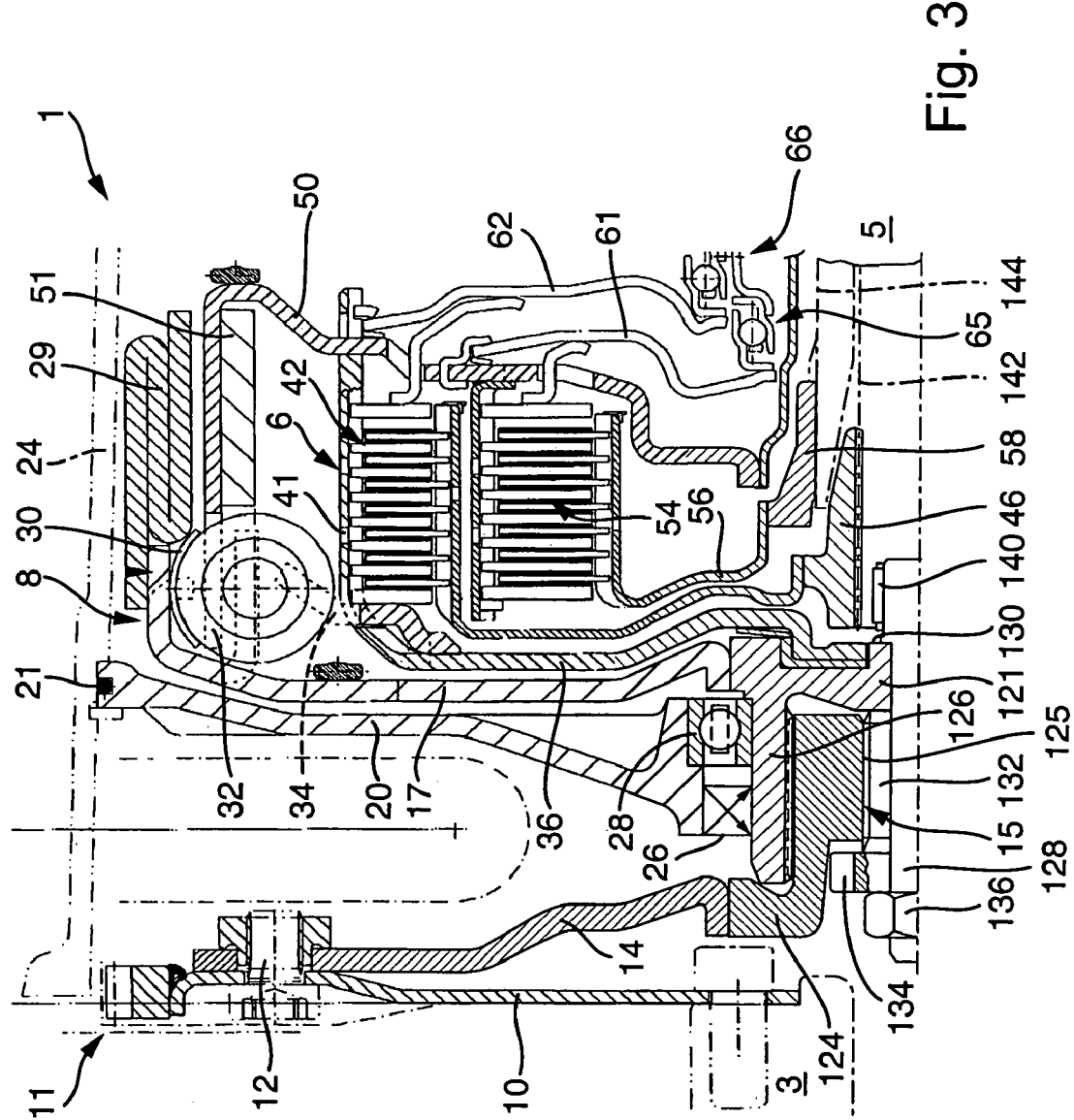
FIG. 3 shows a half-sectional view of a torque transmitting unit according to the present invention, in accordance with another exemplary embodiment.

FIG. 3 shows an exemplary embodiment of a torque transmitting unit according to the present invention, similar to that in FIG. 1. The same reference labels are used to designate the same or similar parts. To avoid repetitions, we refer to the preceding description of FIG. 1. In the following description we will only go into the differences between the two embodiments.

In the exemplary embodiment shown in FIG. 3, hub part 15 is not formed in one piece but in two parts. Hub part 15 includes a hub bearing part 121 which is releasably attachable, i.e., repeatedly non-destructively separable, in a rotationally fixed attachment to a hub bearing part 124. Hub bearing part 121 has a cone-shaped section 126, which tapers down in the direction of the transmission. Furthermore, cone-shaped section 126 has inner teeth. Coupling part 124 has a cone-shaped section 125 which is complementary in design to cone-shaped section 126 of hub bearing part 121. Cone-shaped section 125 of coupling part 124 is provided with external teeth which engage the internal teeth of hub bearing part 121. The cone-shaped form guarantees attachment of coupling part 124 to hub bearing part 121 without any play.

Coupling part 124 is fixed on hub bearing part 121 in the axial direction with the help of a threaded bolt 128. At the end of threaded bolt 128 facing the transmission there is a shoulder 130, with which the threaded bolt 128 is supported on the end of hub bearing part 121 facing the transmission. A threaded sleeve 132 having outside threading is threaded into complementary inside threading of coupling part 124 in the radial direction between threaded bolt 128 and coupling part 124. The end of threaded sleeve 132 which faces the transmission is supported on a hub bearing part 121. On its end facing away from the transmission, threaded sleeve 132 has a collar 134, with a nut 136 contacting its side which faces away from the transmission, which nut is screwed onto the end of threaded bolt 128 which points away from the transmission. At the end of threaded bolt 128 that points toward the transmission there is a radial bearing 140, through which an inner transmission input shaft 142 is supported indirectly on hub bearing part 121. Inner transmission input shaft 142 is positioned rotatably in a hollow outer transmission input shaft 144.

What is claimed is:

1. A torque transmitting unit for a power train of a motor vehicle for transmitting torque between a drive unit output shaft, and a transmission input shaft, said torque transmitting unit comprising: at least one clutch unit positioned between the drive unit and the transmission; at least one vibration damping unit having an input part and an output part and connected between the drive unit output shaft and the clutch unit, wherein the clutch unit includes a clutch cover part that bounds a clutch-containing volume and that is supported by a transmission housing section; wherein the vibration damping unit is received within the clutch-containing volume bounded by the clutch cover part; and wherein both the input part and the output part of the vibration damping unit are rotatably supported relative to the clutch cover part by a radial bearing that is received in the clutch cover part.

2. A torque transmitting unit in accordance with claim 1, wherein the vibration damping unit is positioned radially outwardly of the at least one clutch unit and is in axial overlapping relationship with the at least one clutch unit.

3. A torque transmitting unit in accordance with claim 1, wherein the input part of the vibration damping unit includes a vibration damping unit cage in which springs are at least partially incorporated, which springs are in engagement with the output part of the vibration damping unit.

4. A torque transmitting unit in accordance with claim 1, wherein the input part of the vibration damping unit is secured to a hub that radially supports the clutch cover part.

5. A torque transmitting unit in accordance with claim 4, wherein the hub includes a hub part having an internal conical surface that includes internal teeth that engage external teeth formed on a coupling part that has an outer conical surface that is formed complementarily to the internal conical surface of the hub bearing part.

6. A torque transmitting unit in accordance with claim 5, wherein the coupling part is removably connected with the hub part so that it can repeatedly be separated non-destructively.

7. A torque transmitting unit in accordance with claim 6, wherein the coupling part is held in position relative to the hub part by a connecting bolt.

8. A torque transmitting unit in accordance with claim 4, wherein the output part of the vibration damping unit is axially and radially supported on the hub.

9. A torque transmitting unit in accordance with claim 1, wherein the at least one clutch includes a multiple-disk wet-operating clutch.

10. A torque transmitting unit in accordance with claim 1, wherein two wet-operating clutches are positioned coaxially and in axial overlapping relationship.

11. A motor vehicle power train including a torque transmitting unit in accordance with claim 1.

* * * * *